United States Patent [19]

Löper

[11] Patent Number: 4,512,614
[45] Date of Patent: Apr. 23, 1985

[54] WHEEL COVER WITH RETAINMENT SYSTEM

[75] Inventor: Bernd Löper, Korb, Fed. Rep. of Germany

[73] Assignee: Daimler-Benz A.G., Stuttgart, Fed. Rep. of Germany

[21] Appl. No.: 419,487

[22] Filed: Sep. 17, 1982

[30] Foreign Application Priority Data

Sep. 19, 1981 [DE] Fed. Rep. of Germany ....... 3137319

[51] Int. Cl.³ ............................................. B60B 7/06
[52] U.S. Cl. ............................ 301/37 P; 301/37 CD
[58] Field of Search ................. 301/37 R, 37 P, 37 C, 301/37 CD, 108 R, 108 A, 37 PB, 37 T

[56] References Cited

U.S. PATENT DOCUMENTS 2,167,101  7/1939  Burger ........................... 301/108 R
4,361,359 11/1982  Binnewies et al. ........... 301/37 R X

FOREIGN PATENT DOCUMENTS 55-79703  6/1980  Japan ............................... 301/37 R Primary Examiner—David A. Scherbel
Attorney, Agent, or Firm—Craig & Burns

[57] ABSTRACT

A wheel cover with a retainment arrangement that includes several U-shaped retaining springs clipped onto a circumferential ring; the retaining springs engage thereby with one leg in a groove-shaped recess provided in the wheel rim while the circumferential ring consists of a separate essentially non-springy support ring; the wheel cover is thereby supported at the support ring while the retaining springs are clipped onto the support ring.

17 Claims, 3 Drawing Figures

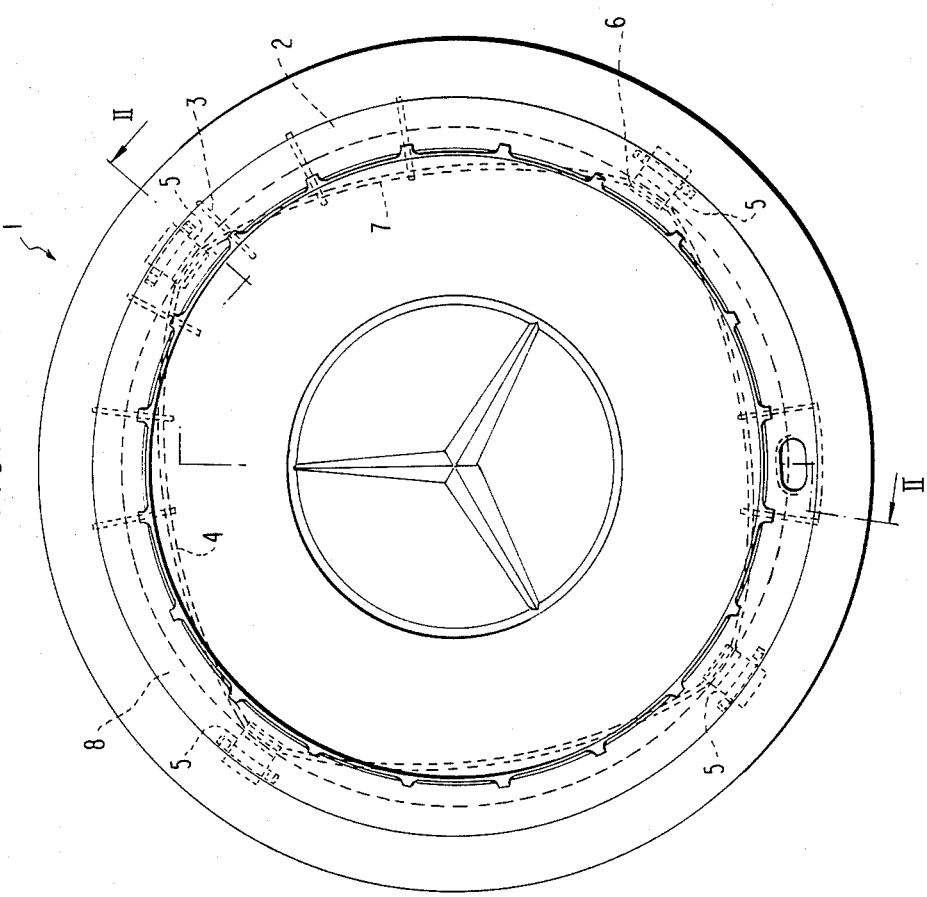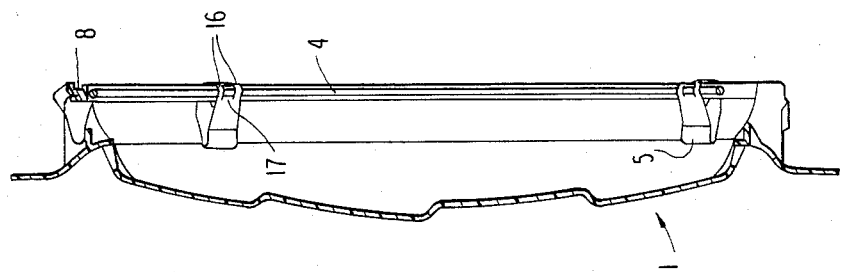

WHEEL COVER WITH RETAINMENT SYSTEM

The present invention relates to a wheel cover or hub cap with a retainment arrangement which includes several U-shaped retaining springs that are clipped onto a circumferential ring and engage with one leg into a groove-shaped recess provided in the ring.

Such wheel covers are known, for example, from the German Offenlegungsschrift No. 29 31 163. The retaining springs described therein engage with one leg in a groove-shaped recess of the wheel rim and are clipped with the other leg onto a circumferential ring which is a component of the wheel cover. By reason of the fact that the retaining springs are thus supported with one leg at the wheel cover, the latter has to be constructed so sturdily and rigidly within the area of the circumferential ring that it is able to absorb the forces which act in the axial direction during the assembly and in the radial direction in the fastened condition. With wheel covers which, for reasons of costs and shape are made of plastic material, material fatigue phenomena may occur within the area, in which the retaining springs are secured, so that a reliable fastening of the wheel cover which is effective in a stable manner for a long period of time, can be impaired thereby.

It is also known already in the prior art (German Offenlegungsschrift No. 29 48 448) to relieve the retaining ring from the occurring forces in that the retaining springs are supported with both legs at the wheel rim respectively at the wheel dish. This construction enables the use of plastic material wheel covers, however, it limits the universal usability and applicability of this retaining system since quite a particular construction of the wheel rim and of the wheel dish is required in order to achieve the desired results.

Accordingly, it is the principal object of the present invention to provide a retainment arrangement for a wheel cover which is applicable and utilizable universally, whereby at the same time the wheel cover remains far-reachingly free from the forces which occur in the assembled position as also during the assembly.

The present invention essentially consists in that the circumferential ring consists of a separate non-springy support ring, whereby the wheel cover is suspended at the support ring and the retaining springs are clipped onto the same. The assembly and also the retainment forces are transmitted by this construction from spring element to the support ring without the wheel cover experiencing anything of these forces. The support ring should thereby be constructed rigidly, i.e., non-springly, in comparison to the retaining springs. The wheel cover is then still suspended respectively supported only at the support ring so that it only has to carry forces which correspond to its own weight. An independence from certain constructive features of the wheel dish, respectively, wheel rim is also achieved by the use of a support ring so that the retainment arrangement according to the present invention can be used and applied universally.

It is advantageous to suspend the wheel cover at the support ring by way of the retaining springs. To this end, the retaining springs then are provided with corresponding tongues for the axial securing of the support ring, which engage into parts of the wheel cover or pass around the same. A favorable fastening of the wheel cover at the support ring is then possible if the support ring abuts at a support surface of the wheel cover. As a result thereof, the wheel cover is secured radially and axially with respect to the support ring so that it can be reliably positioned and fixed.

In one advantageous construction of the present invention, provision is made that the support ring abuts radially from the inside at the support surface and the cover is adapted to be pressed-in, whereby the support forces are exactly as large as the retaining forces of the individual support springs in the assembled position of the cover in the wheel.

The support ring is thus brought into abutment at the wheel cover radially from the inside whereby in the assembled position, the retaining forces act opposite the pressing-in forces of the support ring so that these forces far-reachingly cancel each other as regards the loading and stressing of the elements forming the support surfaces, whence the advantages described hereinabove as regards a more simple constructional possibility of the wheel cover can be achieved in a simple manner. A circumferentially extending rim-like retaining member is thereby provided at the wheel cover as support surface. The support ring may be constructed as wire ring which has the shape of a polygon whereby it is provided in the corner areas thereof with sections that extend corresponding to the curvature of the rim-like retaining member. As a result thereof, the support ring abuts at the retaining ring exclusively in the corner areas whereby the support surfaces are then formed thereat in each case. Thus, the support ring may have, for example, the shape of a guadrangle with curved sides. The spring elements are then each installed in the corner areas. As a result thereof, the support surfaces and fastening locations of the spring elements coincide.

By reason of the fact that the corner areas differ from the adjoining sides by the radii of curvature and the retaining springs are clipped-on within the corner areas, it is achieved that the retaining springs cannot be displaced with respect to each other in the circumferential direction on the support ring. They are therefore securely held in the circumferential direction whence also the wheel cover is safely secured.

The support ring can be constructed as open ring which is supported at its end surfaces in the assembled condition under formation of a butting place. This can be of advantage during the fitting of the support ring into the wheel cover. The support ring may also be assembled of several parts, whereby each of the butting places of the support ring components are located inside of a retaining spring. As a result thereof, the support ring parts are fixed with respect to one another in such a manner that they cannot move with respect to each other whereby it is assured that the end surfaces always abut against one another for the formation of the butting places.

It is additionally of advantage if the leg of the retaining spring which engages in a U-shaped recess of the wheel rim, abuts in an inwardly directed circumferential groove provided in the rim-like retaining member by means of a hook-shaped bent end for purpose of prestressing the spring elements. As a result thereof, the assembly forces, properly speaking, are reduced also with this retaining system since the spring elements can be prestressed already prior to the emplacement of the wheel cover onto the wheel rim. In the assembled condition, the retaining forces are then further transmitted from the spring element to the support ring so that also the rim-like retaining member itself does not need to be constructed in a particularly sturdy and stable manner.

In another embodiment of the present invention, in which the wheel cover is not suspended at the support ring by way of the retaining springs, provision may be made to suspend the wheel cover at the support ring by way of separate loop-shaped wire elements. These loop-shaped wire elements then establish the connection between the support ring and the wheel cover whereby the connecting places at the support ring may be located at any place between the retaining springs. In this embodiment, the diameter of the support ring can be selected smaller, as desired, than the diameter of the retaining ring in the support ring. Thus, an independence of these two radii to be compared can be realized. Similarly, the corresponding places at the wheel cover, from which the fastening and fixing takes place by means of the loop-shaped wire elements, can be arranged on a smaller radius than the radius of the support ring. Also in this case the wheel cover only has to carry its own weight.

These and other objects, features and advantages of the present invention will become more apparent from the following description when taken in connection with the accompanying drawing which shows, for purposes of illustration only, one embodiment in accordance with the present invention, and wherein:

FIG. 1 is a plan view on a wheel cover constructed in accordance with the present invention;

FIG. 2 is a cross-sectional view through the wheel cover of FIG. 1, taken along line II—II thereof.

Figure 3:
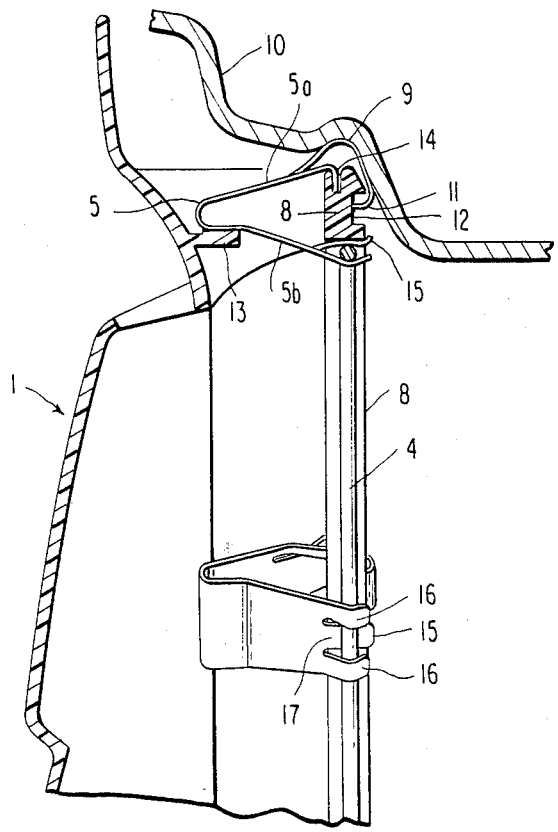
FIG. 3 is a partial cross-sectional view, on an enlarged scale, of the upper section of the wheel cover illustrated in FIG. 2 together with a part of the wheel rim.

Referring now to the drawing wherein like reference numerals are used throughout the various views to designate like parts, and more particularly to FIG. 1, reference numeral 1 generally designates therein a wheel cover constructed in accordance with the present invention which is preferably made of any suitable plastic material. Within an outer area the wheel cover 1 is provided with recesses 2 which are separated from one another by the cross webs 3.

Customarily, these wheel covers are pressed onto the wheel rims by way of retaining springs 5 and are retained thereat by the forces of the retaining springs 5.

In the wheel cover illustrated in FIG. 1, four retaining springs 5 are provided which are clipped with one leg in a manner to be described more fully hereinafter onto a support ring 4 and engage with the other leg in a recess 9 of the wheel rim 10. The forces on the wheel cover 1 during the assembly and also in the fastened positioned are thus kept as small as possible. The support ring 4 is constructed as a polygon—in the illustrated embodiment as square, as viewed in the axial direction of FIG. 1—whereby the retaining springs 5 are clipped-on in the corner areas 6 of the square. A wire is used for the support ring 4, which is bent in FIG. 1 of the manner shown in the drawing so that the curved sides 7 extend between the corner areas 6. Compared to the spring characteristics of the retaining springs 5, the support ring 4 can be characterized as rigid. It can be constructed in one piece either as an endless ring or as an open ring whereby, if an open ring is used, the butting places resulting at the end surfaces are then so formed that they are located in the corner areas 6 in which are also arranged the retaining springs 5. It is assured by a bend or kink each between the corner areas 6 and the more or less straight sides 7 (FIG. 1) of the support ring 4 that the retaining springs 5 cannot be displaced in the circumferential direction with respect to the support ring 4. If the support ring 4 is composed of several section, the subdivision of the section is so realized that the butting places are each again located in the corner areas 6.

As can be further recognized from FIG. 1, the diameter of the support ring 4 in the corner areas 6 is so selected that the support ring 4 abuts at the radially inwardly directed surface of a rim-like retaining member 8 whose radially inwardly directed circumferential surface is indicated in FIG. 1 in dash lines and which is constructed as part of the wheel cover. As can be seen from FIGS. 2 and 3 the retaining member 8 thus forms a support surface for the support ring 4. It can additionally be seen from FIGS. 2 and 3 that the retaining springs 5 are provided at the radially inner leg 5B thereof with two circumferentially spaced outer tongue portions 16 which subtend together with a center 5b tongue portion 17, an angle so that the retaining springs 5 are adapted to be clipped onto the support ring 4 with the aid of these tongue portions 16 and 17. The center tongue portion 17 them comes to lie in each case between the retaining member 8 and the support ring 4.

FIG. 3 illustrates in partial cross section and on an enlarged scale the upper area of the wheel cover illustrated in FIG. 2 in a position secured at a wheel rim 10. The wheel rim 10 is thereby shown partially in cross section whereby it includes a groove-shaped recess 9 into which engages the radially outer leg 5a of the retaining spring 5 in the fastened position. The end 11 of this leg 5a is bent hook-shaped and comes into abutment in a non-fastened position in an axially rearwardly directed groove 12 of the rin-like retaining member 8, as a result of which the retaining springs 5 are prestressed.

For purposes of assembly, at first the retaining springs 5 are clipped onto the rim-like retaining member 8. The web 14 bent out of the leg 5a thereby engages in a groove of the retaining member 8 whereas the hook-shaped end 11 of the leg 5a comes into abutment at the groove 12 of the retaining member 8 whereby the spring forces resulting from the spreading of the U-shaped retaining springs 5 have as a consequence that the retaining springs 5 are retained under prestress at the retaining member 8. The upwardly bent end 15 of the center tongue portion 17 serves for further fixing the cover with respect to the retaining springs 5 whereby an abutment ring 13 (FIG. 3) provided on the inside of the wheel cover 1 forms a positional security for the retaining springs 5, whereby this abutment ring 13 essentially does not have to absorb or support any forces with an assembled as also with an unassembled wheel cover. For the purpose of further assembly, the support ring 4 is inserted between the center tongue portion 17 and the outer tongue portion 16 of the leg 5b whereby the retaining springs 5 form together with the support ring 4 a support framework for the wheel cover which is suspended thereon essentially free of forces—again by way of the retaining springs 5. When the cover is placed on the wheel rim 10, the assembly forces occurring at the leg 5a are transmitted directly to the leg 5b and therewith onto the support ring 4, whereby the retaining member 8 remains free of these forces. Only those forces then still act at the rim-like retaining member 8 in the assembled position which correspond to the weight of the wheel cover itself so that a particularly sturdy and stable construction of this retaining member 8 is not necessary. In addition to the advantage of relieving the retaining member 8, a fastening according to the present invention additionally offers also the advantage that no special requirements have to be made of the construction of the rim 10 for the support of the leg 5a so that such a retaining system can be used for different types of constructions of wheel rims whereby the latter have to be provided merely with a groove-shaped recess 9 for the accommodation of the one leg.

It is also within the scope of the present invention to construct the support ring in such a manner that it does not abut in any location against the wheel cover. Also, the wheel cover need not necessarily be suspended or supported at the support ring by way of the retaining springs. The advantages described hereinabove can also be achieved if the wheel cover is connected with the support ring by way of separate loop-shaped wire elements independent of the retaining springs.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A retaining arrangement for a wheel cover made of plastic material and having a rim-like retaining means, comprising several substantially U-shaped retaining spring means having inner and outer legs, a circumferential, essentially non-springy support ring means, said retaining spring means being operable to engage with the radially outer leg thereof in a groove-shaped recess of a wheel rim, the inner leg of the retaining spring means being inserted, secured against rotation and axial displacement, in the rim-like retaining means of the wheel cover and being supported at said support ring means, and the retaining spring means being clipped on the support ring means and being operable thereby to support the wheel cover at the support ring means.

2. An arrangement according to claim 1, wherein said support ring means is a metallic support ring.

3. An arrangement according to claim 1 or 2, wherein the rim-like retaining means includes a support surface and the support ring means abuts at said support surface.

4. An arrangement according to claim 3, characterized in that the support ring means is adapted to be pressed into the wheel cover radially from the inside abutting at the support surface, whereby the support forces are at least approximately of the same magnitude as the retaining forces of the individual retaining spring means in the assembled condition of the wheel cover in the wheel rim.

5. An arrangement according to claim 4, characterized in that a partially circumferential retaining ring means is provided as support surface.

6. An arrangement according to claim 5, characterized in that the leg of the retaining spring means engaging into a groove-shaped recess of the wheel rim abuts with a hook-shaped end in an axially inwardly directed circumferential groove in the rim-like retaining means for prestressing the retaining spring means.

7. An arrangement according to claim 4, characterized in that the support ring means has the shape of a polygon.

8. An arrangement according to claim 7, wherein the support ring means essentially has the shape of a square with curved sides.

9. An arrangement according to claim 7, characterized in that one leg of the retaining spring means is clipped onto the support ring means in the corner areas thereof.

10. An arrangement according to claim 9, characterized in that the support ring means is constructed as open ring which in the assembled condition is supported at its end faces under formation of a butting place.

11. An arrangement according to claim 10, characterized in that the support ring means is composed of several parts.

12. An arrangement according to claim 11, characterized in that the butting places of the support ring means are located inside of a retaining spring means.

13. An arrangement according to claim 3, wherein a rim-like retaining means, which extends partially in the circumferential direction is provided as support surface.

14. An arrangement according to claim 1 or 2, wherein a wire ring is provided as support ring means which, as viewed in the axial direction, has the shape of a polygon that is provided with sections in the corner areas thereof which extend corresponding to the curvature of the rim-like retaining means.

15. An arrangement according to claim 1, characterized in that the wheel cover is supported at the support ring means by way of separate loop-shaped wire elements.

16. An arrangement according to claim 1, wherein said support ring means abuts against the radially inwardly directed surface of the retaining means.

17. An arrangement according to claim 1, 2 or 16, characterized in that the support ring means is constructed as open ring which in the assembled condition is supported at its end faces under formation of a butting place.

* * * * *